Nov. 8, 1966 A. H. LEFEBVRE 3,283,502
FUEL INJECTION SYSTEM FOR GAS TURBINE ENGINES
Filed Feb. 24, 1965 5 Sheets-Sheet 2

Inventor
Arthur Henry Lefebvre
By
[signature]
Attorney

Nov. 8, 1966  A. H. LEFEBVRE  3,283,502
FUEL INJECTION SYSTEM FOR GAS TURBINE ENGINES
Filed Feb. 24, 1965  5 Sheets-Sheet 5

United States Patent Office 3,283,502
Patented Nov. 8, 1966

3,283,502
FUEL INJECTION SYSTEM FOR GAS
TURBINE ENGINES
Arthur H. Lefebvre, 4, The Drive, Wharley End,
Cranfield, near Bedford, England
Filed Feb. 24, 1965, Ser. No. 434,885
Claims priority, application Great Britain, Feb. 26, 1964,
7,918/64; Apr. 18, 1964, 16,169/64
12 Claims. (Cl. 60—39.74)

This invention relates to fuel injection systems for gas turbine engine combustion chambers and has for an object to provide a system whereby fuel distribution in the primary zone of the combustion chamber of high performance gas turbines is improved.

Two systems of fuel injection are commonly used at present in the gas turbines of modern aircraft. These are spray atomiser nozzles, and vapourising tubes. In the former, fuel is pumped at high pressure through one or more nozzles into the eddying primary air flow and mixes with this air to maintain a flame front. In the latter, fuel is injected into the open mouths of short tubes whose outlets lie in the primary zone, but bent back through 180°.

In the spray atomiser sytsem, reliance is placed on the kinetic energy of the fuel droplets to penetrate the eddy formation of the reversed air flow from the combustion air ports in the flame tube immediately downstream of the atomiser nozzle. The range of fuel flows required to cover all working conditions can be of the order of 50:1, and since fuel flow is proportional to the square root of the pressure drop across the nozzle, the range of fuel pump pressures necessary for a single nozzle could be as wide as 2,500:1. Since this is far beyond the range of practicability for fuel pumps, the so-called "Duple" nozzle has been developed. This comprises a central pilot jet, which supplies all the fuel required at low fuel flow conditions such as occur, for example, at light-up and at extreme altitudes, surrounded coaxially by an annular main jet which supplies most of the fuel at normal running conditions.

Although duple spray jets are fairly satisfactory, they suffer from certain disadvantages. In operation, fuel penetration across the primary combustion zone is a function of fuel flow, which means that the distribution of fuel throughout the primary combustion zone varies with the amount of fuel supplied. Thus, the pattern of burning changes with the variation in fuel flow, and this is reflected as variations in the temperature traverse at the combustion chamber outlet. This can have an adverse effect on turbine blade life.

Another disadvantage of the spray system is that when the gas pressure is high, the injected fuel is only able to penetrate a short distance from the atomiser and thus gives rise to a fuel-rich region in the centre of the flame tube and near to the atomiser. Combustion of this over-rich mixture is accomplished by the production of large amounts of carbon which give rise to a yellow luminous flame. This in turn radiates considerable luminous heat and can lead to overheating of the flame tube walls. This carbon production is also manifested as exhaust smoke, and this is why many modern high pressure engines are characterised by considerable quantities of exhaust smoke.

In the vapourising tube system, the fuel is injected into the tubes at relatively low pressure, accompanied by some air. The injected fuel-air mixture is heated by the vapouriser tube walls and emerges as a mixture of vapourised fuel and air. Normally, additional air is introduced into the combustion zone through a number of slots in order to make up the total amount of air required for primary zone combustion. The vapourising tube system has the following advantages over the spray system:

(1) because the fuel is injected with some air, very rich mixtures are avoided from the outset, and hence a bluer flame is produced, and the problems of excessive smoke and flame radiation are less serious;

(2) the distribution of fuel throughout the combustion zone is dictated largely by the air flow pattern through the vapourising tubes and the additional slots. This pattern remains sensibly constant and independent of the fuel flow, and hence the outlet temperature pattern is relatively insensitive to change in the fuel flow.

However, the vapourising tube system has several drawbacks. One important disadvantage is that the critical design parameters are not yet fully known and hence trial and error methods are involved both on the drawing board and in development. Other drawbacks are that the tubes are difficult to modify in the course of development; they tend to disintegrate through over-heating, particularly at high pressures where heat transfer rates are high; and they have a relatively poor "weak extinction". This means that they cannot burn down to such weak mixture strengths as the spray system.

Another system of fuel atomisation is "airblast" atomisation. This is a very simple system in which the fuel is caused to flow over a plate or equivalent member located in a high velocity air stream. As the fuel flows over the edge of the plate it is atomised by the high velocity air, which then enters the combustion zone carrying the atomised fuel along with it. Since the fuel droplets are completely airborne, their distribution throughout the combustion zone is dictated by the air-flow pattern.

This method of fuel injection shares many advantages with the vapourising system. For example, the fuel distribution pattern, which controls the combustion pattern and hence the temperature distribution of the exhaust gases, remains fairly constant under all operating conditions. Other shared advantages include the absence of high fuel pressures and, because in both methods the fuel enters the combusion zone premixed with air, the ensuing combustion is characterised by a blue flame of low luminosity, resulting in relatively cool flame tube walls and a minimum of exhaust smoke.

In addition to the above-mentioned advantages over spray injection methods which the airblast atomiser shares with the vapouriser system, airblast atomisation also has an advantage over the latter in that its component parts are not exposed directly to the flame. Thus, whereas the vapourising tubes are immersed in flame and are, therefore, very susceptible to overheating, the airblast atomiser is continuously cooled by the high velocity stream of air flowing over it which is at compressor outlet temperature.

In view of the important advantages of the airblast atomiser over both spray and vapourising systems, it is perhaps surprising that it has not found more widespread application. Unfortunately, however, it suffers from a very poor "weak extinction" value, even worse than that of the vapourising system. Thus, combustion chambers incorporating airblast atomisers are normally incapable of stable combustion at weak mixture strengths corresponding to low fuel flows. Moreover, at conditions where the chamber velocity is low, such as obtained at start-up, for example, the atomisation quality is poor and in consequence combustion performance is unsatisfactory.

According to the present inventon, in order to supplement the range of efficient operation of combustion chambers featuring airblast atomisation, the atomising plate or equivalent member is located in a duct leading to the combustion chamber and which is adapted to direct a high velocity stream of combustion-supporting gas—referred to herein for convenience as air—over the periphery of the plate, whilst a pilot spray nozzle is also mounted in or near the mouth of the said duct to direct fuel droplets into the combustion chamber.

Preferably, means is provided for producing variations in the air velocity approaching the plate. By this means different sections of the periphery of the plate are exposed to different atomising conditions so that the droplets which break away down-stream of the plate have different sizes and different initial velocities.

The means for varying the air flow over the periphery of the plate may be constituted by any convenient form of spoiler placed upstream of the plate. For example, it may be constituted by radial arms of a spider, the arms masking certain portions of the periphery of the plate so that these portions are exposed to a lower local air velocity.

The pilot spray nozzle may with advantage be located in a separate aperture in the wall of the combustion chamber near the mouth of the atomiser duct, or in a flare which constitutes both the mouth of the duct and part of the end wall of the combustion chamber. In either case, provision can readily be made for the separate withdrawal of the spray nozzle for servicing or replacement as necessary without disturbing the airblast atomiser.

Alternatively, however, it may be preferred to house both the airblast atomiser and the spray nozzle in the same duct, and this can be achieved according to a feature of the present invention by providing the atomiser plate with an aperture coaxial with the fuel feed which communicates with a spray nozzle located at an appropriate distance downstream of the plate, the arrangement being such that some of the fuel, and some of the air if required, passes through this aperture for delivery at the spray nozzle. If desired, fuel may be fed to the downstream nozzle through a concentric pipe passing through the aperture in the plate.

With such an arrangement, at low fuel flows all the fuel is supplied from the spray nozzle, and a well-atomised spray is obtained giving efficient combustion at start-up and low-load running. Under normal operation, fuel is supplied to both the airblast atomiser plate and the spray nozzle, the relative amounts being such that at the highest fuel flow conditions most of the fuel is supplied to the airblast atomiser.

By this means the merits of spray atomisation at low fuel flows, namely satisfactory combustion performance and a good weak extinction, are realised, while the defects of the spray system at high fuel flows (corresponding to high air pressures) of a highly luminous flame, excessive exhaust smoke, and sensitivity to fuel flow of the temperature distribution in the exhaust gas, are eliminated.

Practical embodiments of the present invention will now be particularly described, by way of example only, with reference to the accompanying drawings, in which.

Figure 1:
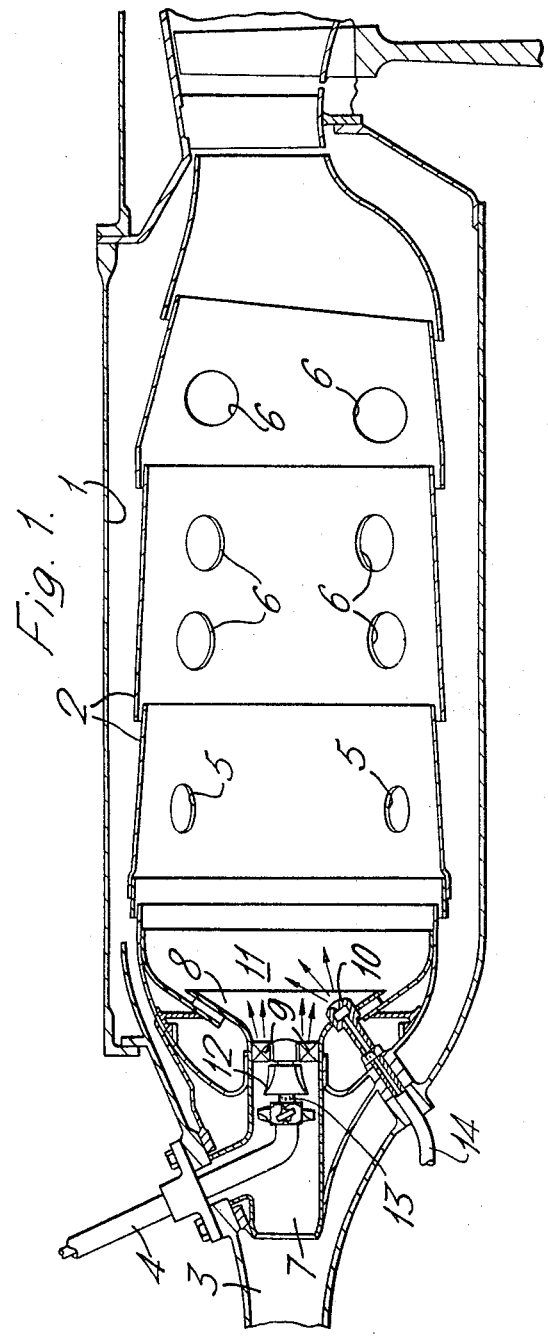
FIGURE 1 is a longitudinal section through a flame tube having a fuel injection system constructed in accordance with one aspect of the present invention.

FIGURE 1 illustrates a form of combustion equipment suitable for a gas turbine comprising an outer casing 1 and an inner frame tube 2. Air is admitted to the inlet 3 of the casing from a compressor (not shown), and the conventional rings of combustion and dilution air ports 5, 6 are provided in the wall of the flame tube 2.

At the upstream end of the flame tube 2 is mounted a coaxial air duct 7 suitably dimensioned to divert from the airflow space between the casing 1 and the flame tube 2 the required proportion of the incoming air delivered by the compressor. At the downstream end the duct terminates in a flare or conical wall 8, having at its centre a ring of swirl vanes 9. The flare 8 defines the upstream end of the combustion space 11.

Upstream of the swirl vanes 9 is mounted an airblast atomiser fuel injector consisting of a circular plate or disc 12 coaxial with the duct 7 but of less diameter. Facing the plate is a ring of orifices 13 through which fuel is discharged on to the atomising plate 12.

To one side of the axis of the airblast atomiser 12, 13 is a pilot fuel injector 10 which serves to spray fuel through a nozzle into the combustion chamber at start-up or low load. Each fuel injector 12, 13 and 10 has its own fuel feed pipe 4, 14 respectively.

Figure 2:
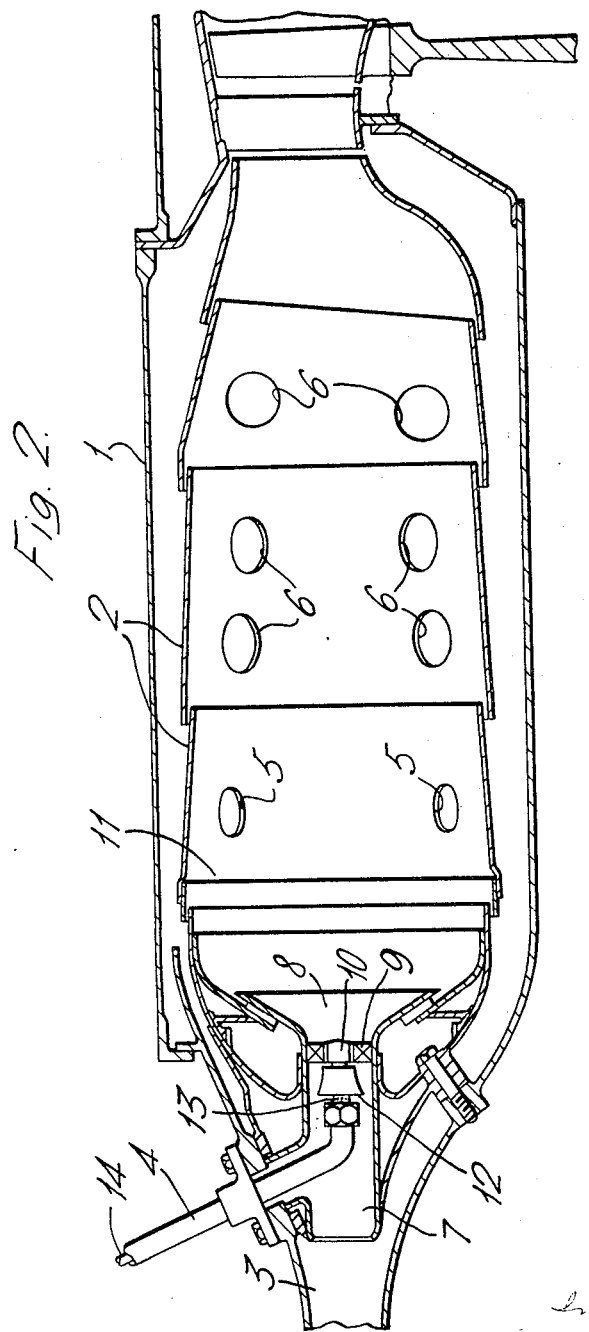
FIGURE 2 is a view similar to FIGURE 1 of a modified construction.
Figure 3:
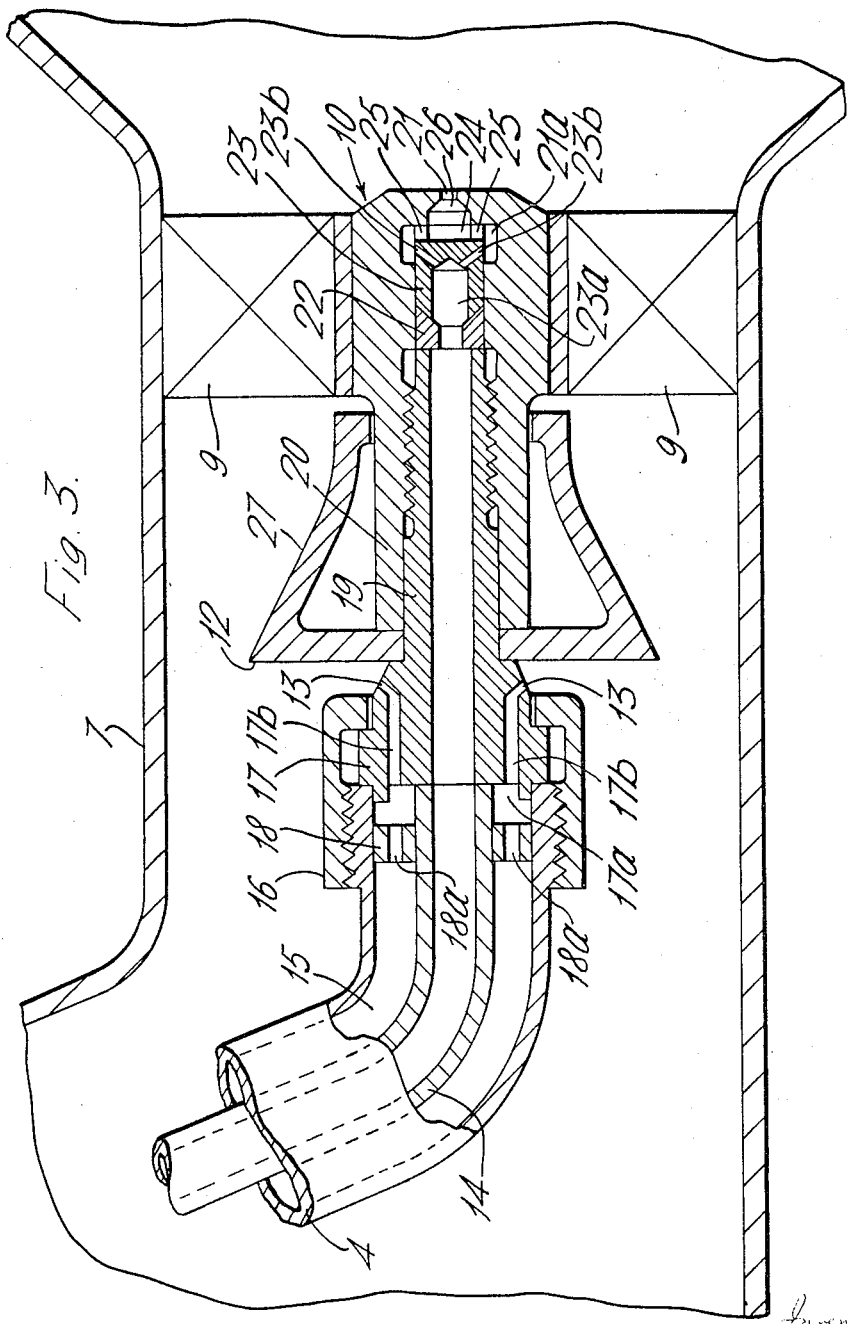
FIGURE 3 is an enlarged sectional view of the fuel injection system of FIGURE 2.

A modification of the fuel injection system of FIGURE 1 is illustrated in FIGURES 2 and 3. It comprises as an integral structure both the swirl type pilot fuel injector 10 and the main airblast atomiser injector 12, 13, the two injectors being coaxial.

The combined fuel injector is carried by a double or coaxial fuel feed pipe having a central duct 14 for supplying fuel to the pilot fuel injector 10 and an outer pipe 4 defining an annular passage 15 for supplying fuel to the main airblast atomiser. The end of the outer pipe 4 is threaded and is engaged by a cap nut 16 which retains an annular main nozzle member 17 and a spacerplate 18 in position against the end of the pipe. Fuel flows from the annular passage 15 in the pipe 4 through holes 18a in the spacer plate 18 into the annular grove 17a in the main nozzle member 17. The nozzle member 17 is also formed with a series of drillings 17b leading from the groove 17a to a series of orifices 13. The main spray orifices 13 are arranged with their axes on the surface of a cone of wide apex angle.

A transfer pipe 19 integral with the nozzle member 17 is threaded at its end remote from the main annular nozzle member 17 and has screwed on to it a sleeve-like extension 20 on the main body of the pilot fuel injector 10 in which is formed a pilot spray nozzle orifice 21. The body 10 has a central bore containing a spacer washer 22 which abuts the end of the transfer pipe 19, and a fuel distributor plug 23 having a central chamber 23a receiving fuel from the bore through the washer 22 and delivering the fuel through a series of drillings 23b into an internal annular channel 21a in the downstream end of the pilot fuel injector body 10.

The end of the body 10 immediately upstream of the pilot spray nozzle orifice 21 is formed with a recess 24 which is connected with the channel 21a by swirl ports 25. The recess 24 registers with the larger end of a coaxial swirl chamber 26 formed in the downstream end of the pilot injector body 10 and leading to the pilot nozzle orifice 21. Fuel entering the chamber 26 leaves the injector as a conical spray through the orifice 21.

The sleeve-like extension 20 on the main body 10 also serves to retain against the shouldered portion of the main annular nozzle member 17 the atomising plate 12 which is located and centralised on the transfer pipe 19. The atomising plate 12 is provided with a substantially conical shaped skirt 27 to facilitate the flow of fuel/air mixture through swirl vanes 9.

In the following description of the operation of this combined atomiser, the fuel discharged through the orifice 21 and the orifices 13 are referred to as pilot fuel and main fuel respectively.

In operation at low fuel flows, fuel is pumped through the inner feed pipe 14 and is discharged by the pilot spray nozzle orifice 21 as a conical pilot spray. As the fuel pressure increases, the supply of pilot fuel also increases until, at a predetermined delivery pressure of the fuel, spring-loaded valves (not shown) open to allow fuel to pass through the outer feed passage 15 and be discharged by the main orifices 13 to be distributed over the upstream face of the plate 12. Thus at low fuel flows, all the fuel is discharged from the pilot spray injector 10, whilst at higher rates of fuel flow excess over the maximum which can be handled by the pilot spray nozzle 21 discharged over the upstream face of the plate 12 to be entrained by the air and issued as a mixture through the swirl vanes 9.

A known disadvantage of airblast atomisers is that the fuel droplets produced tend to be of the same size, and thus when injected into the combustion zone they all follow the same path around the flow reversal, whereas if their sizes were more varied they would distribute themselves better across the combustion zone.

Tests have shown that droplet size is governed mainly by the local air velocity over the edge of the atomiser plate. According to a preferred feature of this invention means are provided for producing variations in the air velocity over the edge of the plate 12. By this means different sections of the periphery of the plate are exposed to different atomising conditions so that the droplets which break away downstream of the plate 12 have different kinetic energies.

Figure 4:
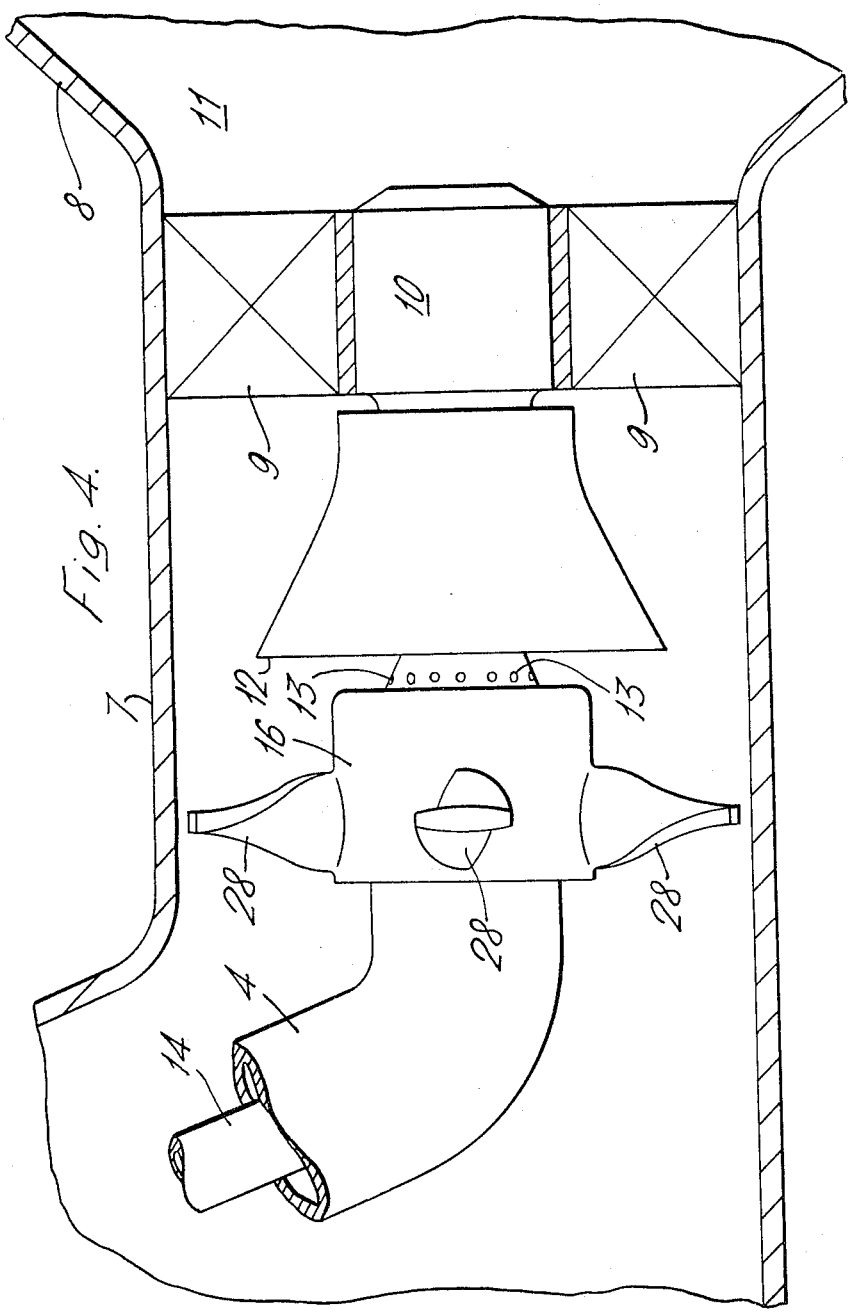
FIGURE 4 is a part-sectional view similar to FIGURE 3 showing a further modification.

The means for varying the air flow over the periphery of the plate 12 may be constituted by any convenient form of spoiler placed upstream thereof. One practical embodiment of this spoiler is shown in FIGURE 4, which shows an airblast atomiser identical in construction to the atomiser shown in FIGURES 2 and 3, except that a spoiler is provided upstream of the plate 12 in the form of a number of radial blades or spokes 28 attached to the cap nut 16. FIGURE 1 also shows such a spoiler 28.

The action of the spoiler is to partially mask discrete portions of the periphery of the plate 12 so that the velocity of air flow over these portions is reduced in relation to the airflow over the unmasked portions. Consequently, the average size of droplet which breaks away from the masked portions will be greater than the average size of those which break away from the unmasked portions, and hence a wider range of droplet size is achieved. Consequently, when the droplets pass through the swirl vanes 9 they enter the primary combustion zone 11 with a variety of kinetic energies, and improved mixing of fuel and air and combustion products results. This leads to a general improvement in combustion performance.

Other forms of spoiler may be adopted as preferred. For example, the duct 7 may be fitted with an internal ring (not shown) which projects into the air stream and produces therein a velocity profile such that velocity is at a maximum near the centre of the duct 7 and gradually diminishes with increase in duct radius, being a minimum near the walls. The plate 12 has a castellated edge such that discrete portions of the edge are located at different radii in the duct and are thereby exposed to different air velocities resulting in a wider range of droplet size.

In another example (not shown) there may be a ring of vanes around the internal wall of the duct 7, and provision may be made for adjustability of their angle or extent of their projection into the air stream as required.

Figure 5:
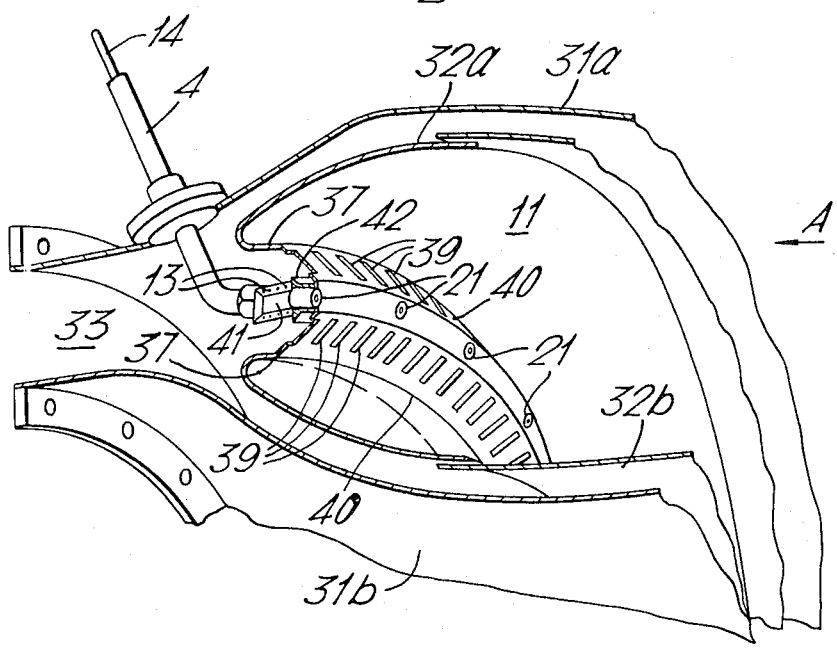
FIGURE 5 is a fragmentary sectional perspective view through an annular combustion chamber showing the fuel injection system of the present invention adapted thereto.
Figure 6:
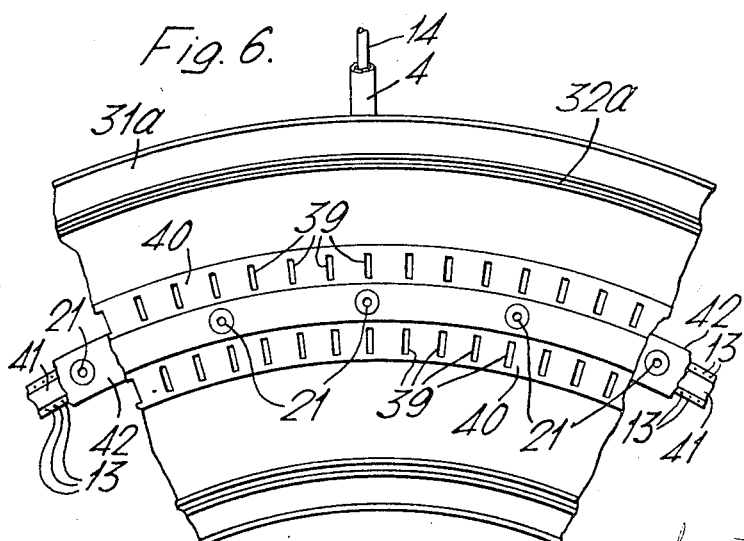
FIGURE 6 is a fragmentary view on the arrow A in FIGURE 5.

FIGURES 5 and 6 illustrate the adaptation of the invention to an annular combustion chamber. The chamber is defined by the concentric walls 32a, 32b which are concentrically spaced from the walls 31a, 31b of an annular casing. At their upstream ends, the inner walls 32a, 32b are bent mutually inwards to support or form a ring 40 of generally regular trapezoidal section, the base of the trapezium being open towards the air inlet annulus 33. The ring 40 springs from short cylindrical return walls 37, integral with the walls 32a, 32b, which define an annular primary air duct corresponding to the duct 7 in FIGURES 1–4. A series of coaxial feed pipes 4, 14 (only one is shown) are spaced at regular intervals around the outer wall 31a of the annular casing, and feed fuel respectively to main spray orifices 13 and pilot spray nozzles 21. The main spray orifices 13 are formed in the divergent flanks of an annular trapezium-section duct 41 fed from the outer concentric fuel pipes 4 and are directed against the upstream radial surface of an annular airblast atomiser plate or ring 42 coaxial with the annular duct 41. The pilot spray nozzles 21 are carried in the crown of the trapezium-section rings 40 at regular intervals more widely spaced than the orifices 13, and are fed from the inner concentric pipes 14.

The flanks of the ring 40 are pierced at regular intervals with slots 39 which are the equivalent of the swirl vanes 9 in FIGURES 1–4 and through which is introduced into the primary combustion space 11 the air from the primary air duct 37 which mixes with the pilot fuel injected through the pilot spray nozzles 21. At high rates of fuel flow, the slots 39 also introduce into the combustion space 11 the fuel/air mixture obtained from the airblast atomiser combination 13, 42.

It will thus be seen that the arrangement of FIGURES 5 and 6 is the equivalent, for an annular combustion chamber, of the pilot spray 10 and airblast atomiser 12, 13 of FIGURE 1.

I claim:

1. A liquid fuel burner comprising a combustion chamber, an air duct opening into the chamber, a ring of swirl vanes in the mouth of said duct, a spray nozzle supported coaxially in said duct mouth by said swirl vanes, an airblast atomiser located in said duct, said atomiser including a fuel supply element in the form of a flooded edge projecting into the airstream and located upstream with respect to the combustion space upstream of said nozzle, a first fuel feed pipe passing centrally through said atomiser to said nozzle, and a second fuel feed pipe coaxially surrounding said first pipe and leading to said atomiser.

2. A liquid fuel burner comprising a flame tube having a primary combustion chamber at one end, an outer casing enclosing said flame tube, an air inlet to said casing, an air duct within said inlet and opening into said primary combustion chamber, an airblast atomiser located in said air duct, said atomiser including a fuel supply element in the form of a flooded edge projecting into the airstream and located upstream with respect to the combustion space, a main fuel feed pipe for supplying fuel to said atomiser, a pilot spray nozzle for discharging fuel directly into said primary combustion chamber, and a pilot fuel feed pipe to said nozzle.

3. A liquid fuel burner comprising an annular combustion chamber, an annular air duct opening into the primary combustion space thereof, an annular airblast atomiser located within said air duct, said atomiser including a fuel supply element in the form of a flooded edge projecting into the airstream and located upstream with respect to the combustion space, and a ring of pilot spray nozzles for discharging fuel directly into the primary combustion space of said combustion chamber.

4. A liquid fuel burner comprising an annular combustion chamber, an annular air duct opening into the primary combustion space thereof, an annular airblast atomiser plate concentrically mounted in the annular air duct and located upstream with respect to said primary combustion space, an annular fuel duct having main fuel jet orifices directed towards the upstream face of said annular atomiser plate, a ring of pilot spray nozzles mounted so as to discharge fuel into the primary combustion space, and separate fuel feeds to the annular fuel duct and the pilot spray nozzles.

5. A liquid fuel burner comprising an annular combustion chamber, an annular air duct opening into the primary combustion space thereof, an annular airblast atomiser mounted within said air duct and located upstream with respect to said primary combustion space, an annular wall of generally trapezium-shaped cross-section closing said air duct at the combustion chamber end thereof, a plurality of closely spaced openings in each flank of said trapezium section wall for the discharge of fuel-laden air into said primary combustion space from said atomiser, a ring of pilot spray nozzles in the radial section of said trapezium-shaped wall, and separate fuel feeds to said airblast atomiser and said pilot spray nozzles.

6. A liquid fuel burner comprising an annular combustion chamber, an annular air duct opening into the primary combustion space thereof, an annular airblast atomiser located within said air duct, said atomiser including a fuel supply element in the form of a flooded edge projecting into the airstream and located upstream with respect to the combustion space a perforated annular wall across the discharge end of said air duct, a ring of pilot spray nozzles mounted in said annular wall, and fuel feed pipes for said airblast atomiser and said pilot spray nozzles.

7. A liquid fuel burner comprising a combustion chamber, an air duct opening into the chamber for supplying primary combustion air to the combustion space thereof, an air-blast atomiser in said air duct, said atomiser including a fuel supply element in the form of a flooded edge projecting into the air stream and located upstream with respect to the combustion space, a spray nozzle opening into said chamber, and separate fuel lines to said atomiser and said spray nozzle.

8. A liquid fuel burner according to claim 7, wherein the spray nozzle is mounted in the wall of said chamber to one side of the mouth of said air duct.

9. A liquid fuel burner according to claim 7, wherein the air duct has a flared mouth opening into said chamber, and the spray nozzle is mounted in said flared mouth eccentric to the axis of said duct.

10. A liquid fuel burner according to claim 7, wherein the spray nozzle is mounted coaxially in the mouth of said duct, and said separate fuel lines include a first fuel feed line passing centrally through said atomiser to said nozzle, and a second fuel feed line coaxially surrounding said first line and leading to said atomiser.

11. A liquid fuel burner according to claim 7 including an air flow spoiler located upstream with respect to said atomiser for selectively varying the velocity of air flow over different zones of the periphery of said atomiser.

12. A liquid fuel burner according to claim 11, wherein the spoiler comprises a plurality of equiangularly spaced radial vanes projecting into the duct.

References Cited by the Examiner
UNITED STATES PATENTS

| | | | |
|---|---|---|---|
| 2,850,875 | 9/1958 | Gahwyler | 60—39.74 |
| 2,920,449 | 1/1960 | Johnson | 60—39.74 |
| 2,999,359 | 9/1961 | Murray | 60—39.74 X |

FOREIGN PATENTS 654,932  7/1951  Great Britain.

MARK NEWMAN, *Primary Examiner.*

RALPH D. BLAKESLEE, *Examiner.*